(12) United States Patent
Kruts et al.

(10) Patent No.: US 10,654,574 B2
(45) Date of Patent: May 19, 2020

(54) AIRFOIL FOR STEADYING AN EVACUATION SLIDE

(71) Applicant: GOODRICH CORPORATION, Charlotte, NC (US)

(72) Inventors: Ivan Kruts, Sacramento, CA (US); Jaro S. Volny, Scottsdale, AZ (US); Drew Hartman, Phoenix, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 390 days.

(21) Appl. No.: 15/449,450

(22) Filed: Mar. 3, 2017

(65) Prior Publication Data

US 2018/0251225 A1    Sep. 6, 2018

(51) Int. Cl.
    *B64D 25/14*    (2006.01)

(52) U.S. Cl.
    CPC .................... *B64D 25/14* (2013.01)

(58) Field of Classification Search
    CPC ...... B64D 25/14; B65G 11/10; B65G 11/103; B65G 11/106; B65G 11/18; B63C 9/01; B63B 2027/145
    See application file for complete search history.

(56) References Cited

U.S. PATENT DOCUMENTS

| | | | |
|---|---|---|---|
| 3,833,088 A | | 9/1974 | Chacko et al. |
| 4,460,062 A | * | 7/1984 | Fisher .................... B64D 25/14 182/48 |
| 4,766,837 A | * | 8/1988 | Parish ..................... B63B 21/48 114/311 |
| 5,906,340 A | * | 5/1999 | Duggal .................. B64D 25/14 182/48 |
| 6,877,696 B2 | * | 4/2005 | Moro ..................... B64D 25/14 182/48 |
| 2004/0118979 A1 | * | 6/2004 | Moro ..................... B64D 25/14 244/137.2 |
| 2016/0236857 A1 | * | 8/2016 | Adams ................... B65D 85/67 |
| 2017/0015429 A1 | * | 1/2017 | Evans .................... B64D 25/14 |
| 2018/0194482 A1 | * | 7/2018 | Volny ..................... B64D 25/14 |

FOREIGN PATENT DOCUMENTS

EP    1431178    6/2004

OTHER PUBLICATIONS

Nylon Chemical Compatibility. 2018. CP Lab Safety. Accessed May 20, 2019. https://www.calpaclab.com/nylon-chemical-compatibility-chart/.*

(Continued)

*Primary Examiner* — Joseph W Sanderson
(74) *Attorney, Agent, or Firm* — Snell & Wilmer LLP (57) ABSTRACT

An inflatable slide for use in an emergency evacuation system of an aircraft includes a main body having a top surface and a bottom surface and that is configured to inflate in response to receiving a flow of fluid. The inflatable slide further includes a first lanyard coupled to the main body. The inflatable slide further includes an airfoil coupled to the first lanyard and configured to exert a force on the main body in a downward direction corresponding to a direction of gravity in response to receiving a wind flow.

12 Claims, 6 Drawing Sheets

(56) References Cited

OTHER PUBLICATIONS

Krier, B. A. (Oct. 27, 1988). How Nylon Changed the World : 50 Years Ago Today, It Reshaped the Way We Live—and Think. Los Angeles Times. Retrieved from https://www.latimes.com/archives/la-xpm-1988-10-27-vw-227-story.html.*
Greenlee, B. (Apr. 5, 2016). Types of Parachute Cord. Retrieved from https://www.bestglide.com/550-cord/.*
European Patent Office, European Search Report dated Apr. 16, 2018 in Application No. 18159785.7-1010.
Anonymous: "A Parachute Sea Anchor, or a Drogue?", Feb. 9, 2013 (Feb. 9, 2013), XP055463901, Retrieved from the Internet: URL:https://web.archive.org/web/20130209065146/https://www.sailboat-cruising.com/par achute-sea-anchor.html.
European Patent Office, European Office Action dated Sep. 16, 2019 in Application No. 18159785.7.

* cited by examiner

AIRFOIL FOR STEADYING AN EVACUATION SLIDE

FIELD

The present disclosure is directed to evacuation systems for use in aircraft and, more particularly, systems for stabilizing inflatable slides of evacuation systems in windy conditions.

BACKGROUND

Evacuation systems of aircraft may include an inflatable slide, such as an evacuation slide, and an aspirator for inflating the inflatable slide. In response to deployment of an evacuation system, a corresponding inflatable slide may inflate and provide a surface for disembarking the aircraft. Occasionally, the evacuation system may be deployed in relatively windy conditions. In that regard, it is desirable to reduce the likelihood of the inflatable slide being lifted and/or moved by a wind flow.

SUMMARY

Described herein is an inflatable slide for use in an emergency evacuation system of an aircraft. The inflatable slide includes a main body having a top surface and a bottom surface. The main body is configured to inflate in response to receiving a flow of fluid. The inflatable slide further includes a first lanyard coupled to the main body. The inflatable slide further includes an airfoil coupled to the first lanyard and configured to exert a force on the main body in a downward direction corresponding to a direction of gravity in response to receiving a wind flow.

In any of the foregoing embodiments, the first lanyard includes a split yoke.

In any of the foregoing embodiments, the main body has a width and the airfoil is centered along the width of the main body.

Any of the foregoing embodiments may also include a second lanyard, wherein the main body has a first side and a second side, the width extends from the first side to the second side, and the second lanyard is nearer the second side than the first lanyard.

Any of the foregoing embodiments may also include a first slip ring coupled to the airfoil and slidably coupled to the first lanyard, and a second slip ring coupled to the airfoil and slidably coupled to the second lanyard.

In any of the foregoing embodiments, the airfoil includes a flexible fabric and at least one cord and resembles an upside-down parachute.

In any of the foregoing embodiments, the flexible fabric includes a nylon-based fabric and the at least one cord includes a nylon kernmantle rope.

In any of the foregoing embodiments, the airfoil includes a rigid airfoil body having an airfoil bottom surface having an outward curvature and an airfoil top surface such that a lower pressure is experienced at the airfoil bottom surface than at the airfoil top surface in response to the airfoil receiving the wind flow.

Also described is an evacuation system for use with an aircraft. The evacuation system includes an aspirator configured to output a flow of fluid. The evacuation system further includes an inflatable slide. The inflatable slide includes a main body having a top surface and a bottom surface. The main body is configured to inflate in response to receiving the flow of fluid from the aspirator. The inflatable slide further includes a first lanyard coupled to the main body. The inflatable slide further includes an airfoil coupled to the first lanyard and configured to exert a force on the main body in a downward direction corresponding to a direction of gravity in response to receiving a wind flow.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
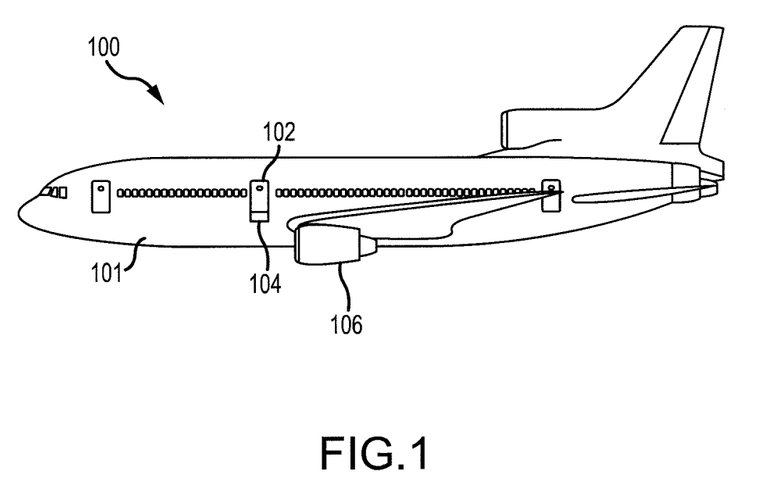
FIG. 1 is a drawing of an aircraft having an exit door and an evacuation system, in accordance with various embodiments.

Referring now to FIG. 1, an aircraft 100 is shown. The aircraft 100 may include a fuselage 101 having plurality of exit doors including an exit door 102. The aircraft 100 may include one or more evacuation systems positioned near a corresponding exit door. For example, the aircraft 100 includes an evacuation system 104 positioned near the exit door 102. The evacuation system 104 may be removably coupled to the fuselage 101. In the event of an emergency, the exit door 102 may be opened by a passenger or crew member of the aircraft 100. In various embodiments, the evacuation system 104 may deploy in response to the exit door 102 being opened and, in various embodiments, the evacuation system 104 may deploy in response to another action taken by a passenger or crew member such as depression of a button or actuation of a lever.

Figure 2:
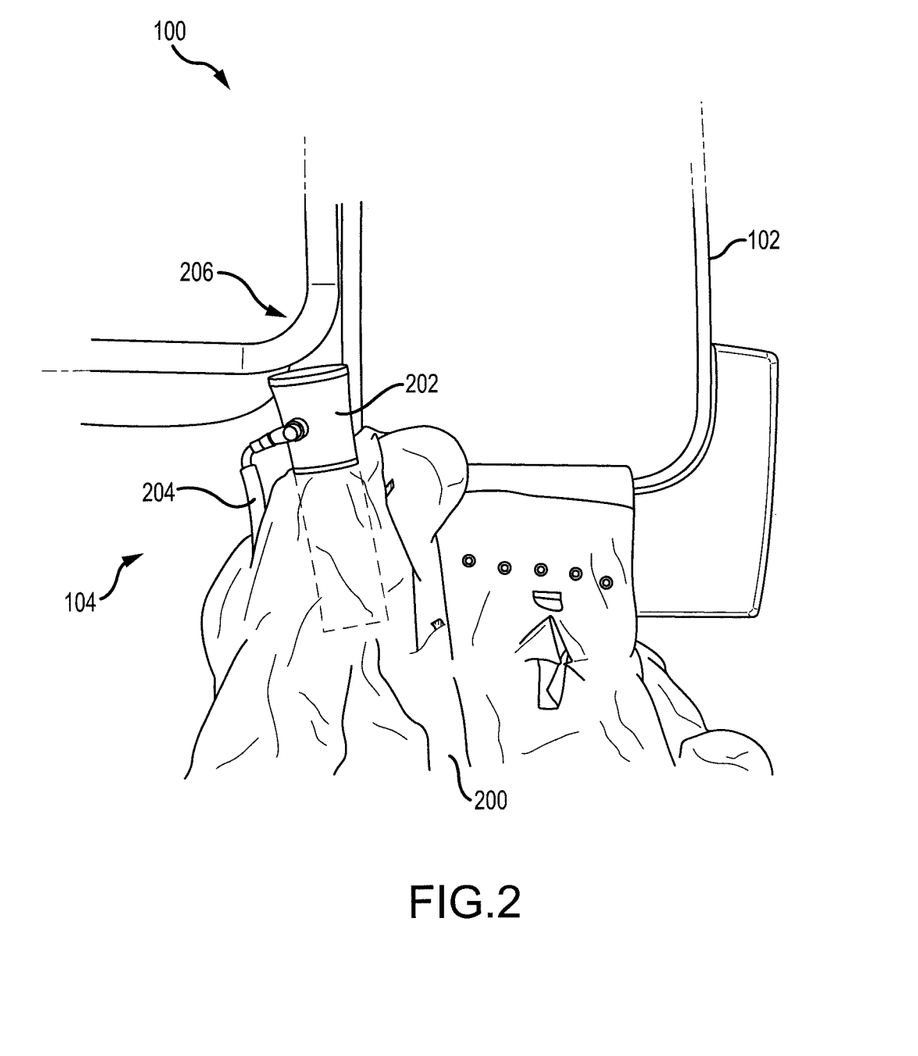
FIG. 2 is a drawing of the evacuation system of FIG. 1 including an inflatable slide, in accordance with various embodiments.

Turning to FIG. 2, additional details of the evacuation system 104 are illustrated. In particular, the evacuation system 104 includes an inflatable slide 200. The evacuation system 104 further includes a source of forced gas 206. The source of forced gas 206 may cause a gas to enter the inflatable slide 200 to inflate the inflatable slide 200. The inflatable slide 200 may be coupled to the fuselage 101 of FIG. 1, and may be decoupled from the fuselage 101 in response to being fully inflated or to being manually detached in order to allow passengers and/or crew members to safely float away from the aircraft 100 of FIG. 1. In various embodiments, the inflatable slide 200 may be permanently coupled to the fuselage 101. In various embodiments, the inflatable slide 200 may function as a slide or other platform for passengers to move from the fuselage 101 to a ground surface upon which the aircraft 100 is resting.

The source of forced gas 206 may include an aspirator 202 coupled to the inflatable slide 200, piping 204 coupled to the aspirator 202, and a compressed fluid source coupled to the piping 204. Under normal operating conditions, the inflatable slide 200 may be deflated and stored within a compartment of the aircraft 100. In various embodiments, the inflatable slide 200 and the aspirator 202 may be stored in a single package within the aircraft compartment. In response to deployment of the evacuation system 104, fluid may flow into the aspirator 202 via the piping 204 at a relatively high velocity. This fluid flow may cause the aspirator 202 to draw gas from the environment. The fluid flow (such as in a gaseous state) and the environmental gas may be directed into the inflatable slide 200. In response to receiving the fluid flow and the environmental gas, the inflatable slide 200 may begin to inflate.

Figure 3:
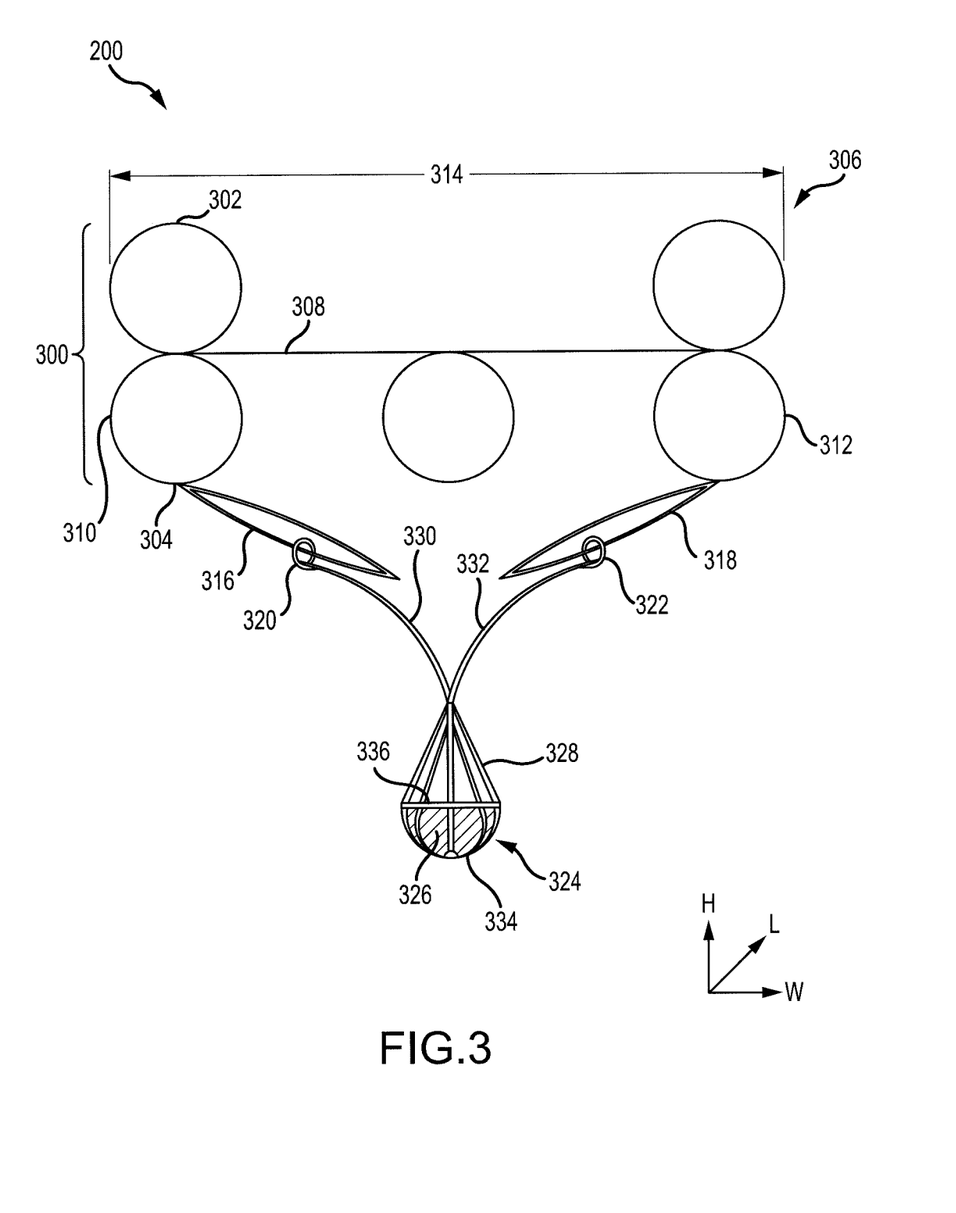
FIG. 3 is a drawing of the inflatable slide of FIG. 2 including a flexible airfoil for stabilizing the inflatable slide in windy conditions, in accordance with various embodiments.

Turning now to FIG. 3, details of the inflatable slide 200 are shown. An H-W-L axis is shown to illustrate a height, a width, and a length, respectively, of the inflatable slide 200.

The inflatable slide 200 has a main body 300. The main body 300 has a top surface 302 and a bottom surface 304. The main body 300 may be inflatable and become inflated in response to receiving the flow of fluid from the aspirator 202 of FIG. 2.

The main body 300 may include a plurality of inflatable portions 306 that inflate in response to receiving a flow of fluid. The main body 300 may further include a platform 308. The platform 308 may provide a surface upon which passengers of an aircraft may slide or otherwise rest upon while moving from the aircraft to a ground surface.

The main body 300 further includes a first side 310 and a second side 312. A width 314 of the inflatable slide 200 extends from the first side 310 to the second side 312.

The inflatable slide 200 may further include at least one lanyard. In particular, the inflatable slide 200 may include a first lanyard 316 and a second lanyard 318. The first lanyard 316 and the second lanyard 318 may each be coupled to the bottom surface 304. The first lanyard 316 may be positioned nearer to the first side 310 than the second lanyard 318.

The first lanyard 316 and the second lanyard 318 may include any type of lanyard such as a loop made of nylon webbing, a loop made of aramid or para-aramid fibers (e.g. that sold under the trademark KEVLAR), a slip yoke (including any material), or the like.

A first slip ring 320 may be slidably coupled to the first lanyard 316 and a second slip ring 322 may be slidably coupled to the second lanyard 318. The slip rings 320, 322 may be capable of moving relative to the corresponding lanyards 316, 318. In that regard, the slip rings 320, 322 may move towards or away from the first side 310 and/or the second side 312. The slip rings 320, 322 may include any material such as, for example, a steel, a fabric (such as nylon webbing or aramid or para-aramid fibers (e.g. that sold under the trademark KEVLAR)), another metal or fabric material, or the like.

An airfoil 324 may be coupled to the lanyards 316, 318. In particular, the airfoil 324 may include a first leader 330 and a second leader 332. The first leader 330 may be coupled to the first lanyard 316 via the first slip ring 320. The second leader 332 may be coupled to the second lanyard 318 via the second slip ring 322. In that regard, the airfoil 324 may move towards or away from the first side 310 and/or the second side 312 via movement of the leaders 330, 332 and via movement of the slip rings 320, 322 relative to the lanyards 316, 318.

The airfoil 324 may include a fabric 326 and at least one cord 328. The fabric 326 may be coupled to the at least one cord 328. The fabric 326 and the at least one cord 328 may be flexible and may resemble a parachute. In that regard, the airfoil 324 may be referred to as a flexible airfoil. In particular, the fabric 326 and the at least one cord 328 may resemble an upside down parachute. For example, the fabric 326 and the at least one coard 328 may have a hemispherical shape, a frustoconical shape, an arced rectangular shape, or the like. The fabric 326 may include any material such as nylon, silk, canvas, aramid or para-aramid fibers (e.g. that sold under the trademark KEVLAR), terylene, or the like. The at least one cord 328 may include nylon, aramid or para-aramid fibers (e.g. that sold under the trademark KEVLAR), or any other material. In various embodiments, the at least one cord 328 may include para cord having a plurality of inner yarns each having two or more strands. In that regard, the at least one cord 328 may include nylon kernmantle rope.

The airfoil 324 may include an outer airfoil surface 334 and an inner airfoil surface 336. The outer airfoil surface 334 may have an outward curve. In that regard, the inner airfoil surface 336 may receive an air flow such that the outer airfoil surface 334 experiences a lower pressure than the inner airfoil surface 336 in response to the airflow.

Figure 4:
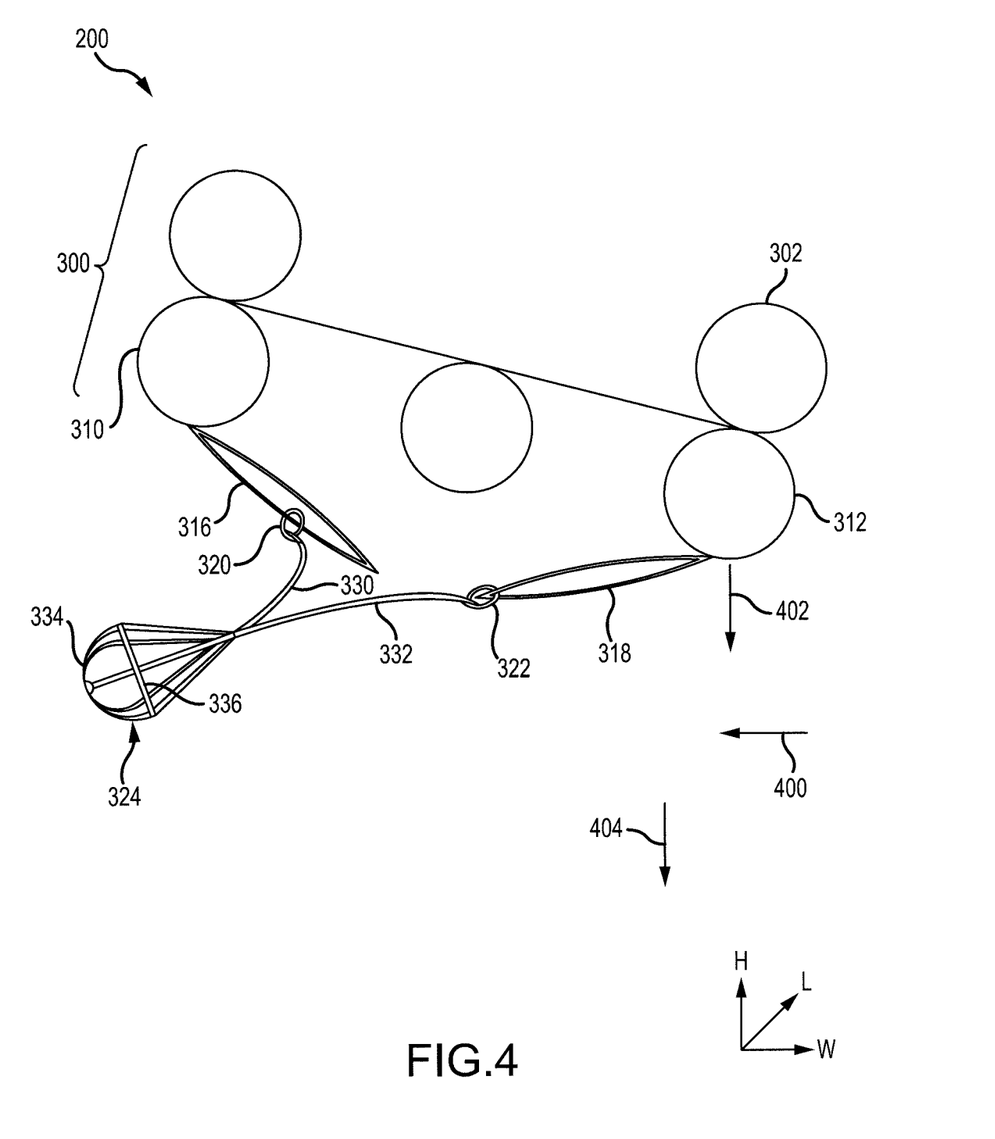
FIG. 4 is a drawing illustrating operation of the inflatable slide of FIG. 2 in windy conditions, in accordance with various embodiments.

Turning to FIG. 4, operation of the inflatable slide 200 is shown. It is desirable for the inflatable slide 200, and in particular the main body 300, to remain relatively close to a ground surface upon deployment. For example and referring to FIGS. 1 and 4, the inflatable slide 200 may be positioned near an engine 106 of the aircraft 100. It is desirable to reduce the likelihood of the main body 300 making contact with the engine 106. In order to reduce the likelihood of such contact, the airfoil 324 may exert a downward force on the main body 300 in response to a flow of wind.

Returning reference to FIG. 4, the inflatable slides 200 may be exposed to a wind flow 400. The airfoil 324 may receive the wind flow 400. In that regard, the shape of the airfoil 324 causes the inner airfoil surface 336 to be oriented in a direction opposite the wind flow 400 such that the inner airfoil surface 336 receives the wind flow 400 and the outer airfoil surface 334 is oriented in a same direction as the wind flow 400.

In response, the wind flow 400 may apply a force to the airfoil 324 in the direction of the wind flow 400. The airfoil 324 may then exert a downward force (i.e., corresponding to a direction of gravity 404 or corresponding to a direction from the top surface 302 to the bottom surface 304) on the second side 312 of the main body 300. In response to this downward force, the second side 312 may be positioned nearer to a ground surface than the first side 310. In response, the wind flow 400 may be received by the top surface 302 of the main body 300, exerting a downward force on the entire main body 300.

The ability of the airfoil 324 to move relative to the main body 300 allows the airfoil 324 to apply a relatively large amount of downward force on the main body 300. In particular, as shown in FIG. 4, the airfoil 324 may move nearer to the first side 310 than the second side 324 due to the flexibility of the leaders 330, 332. Furthermore, the slip rings 320, 322 may move towards the first side 310 relative to the lanyards 316, 318 because the slip rings 320, 322 are slidably coupled to the lanyards 316, 318. Because the airfoil 324 is coupled to the lanyards 316, 318 via the slip rings 320, 322, movement of the slip rings 320, 322 relative to the lanyards 316, 318 allows further movement of the airfoil 324 relative to the lanyards 316, 318 and, thus, relative to the main body 300.

Figure 5:
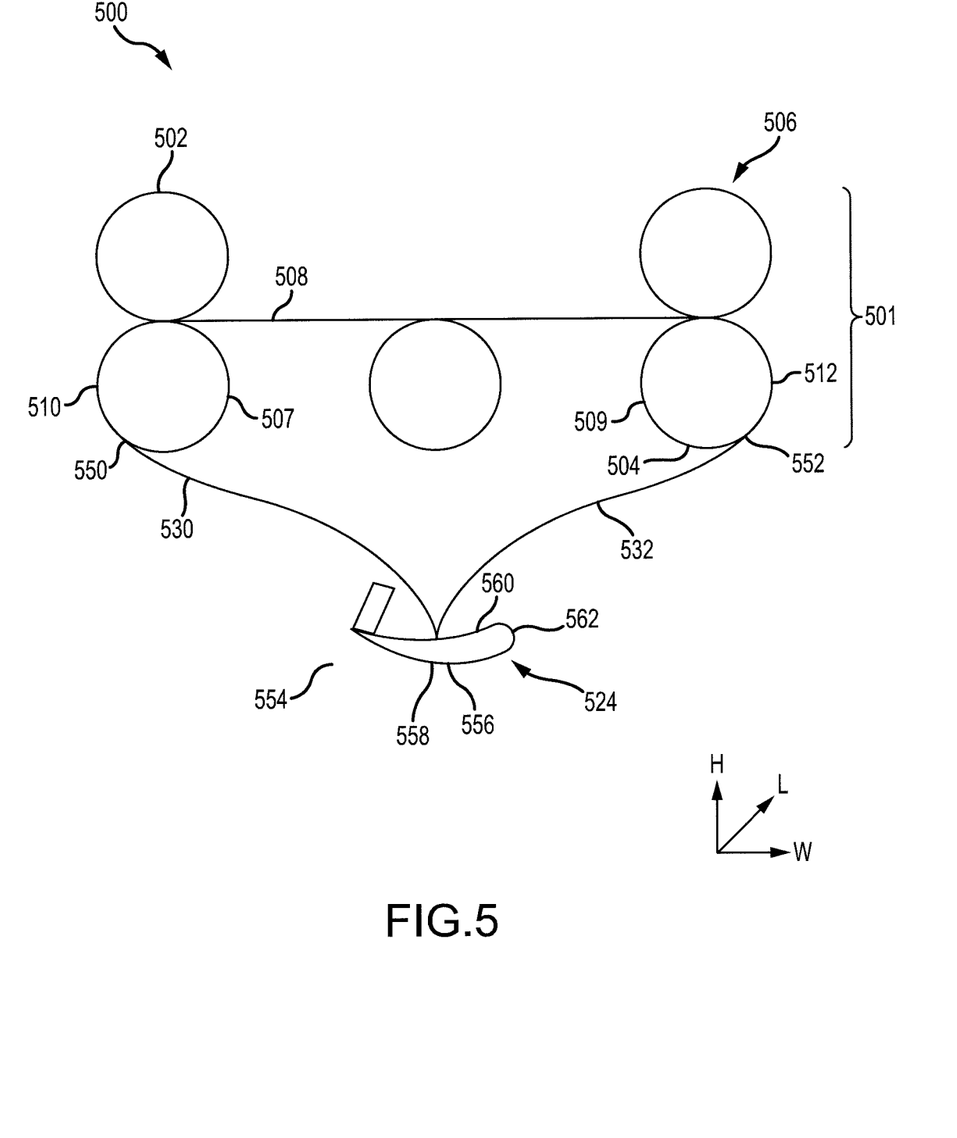
FIG. 5 is a drawing of another inflatable slide including a rigid airfoil for stabilizing the inflatable slide in windy conditions, in accordance with various embodiments.

Turning now to FIG. 5, another inflatable slide 500 is shown. The inflatable slide 500 includes similar features as the inflatable slide 200 of FIG. 2. In particular, the inflatable slide 500 includes a main body 501. The main body 501 has a top surface 502 and a bottom surface 504. The main body 501 may further include a plurality of inflatable portions 506, including a first inflatable portion 507 and a second inflatable portion 509, along with a platform 508. The main body 501 further includes a first side 510 and a second side 512.

Figure 6:
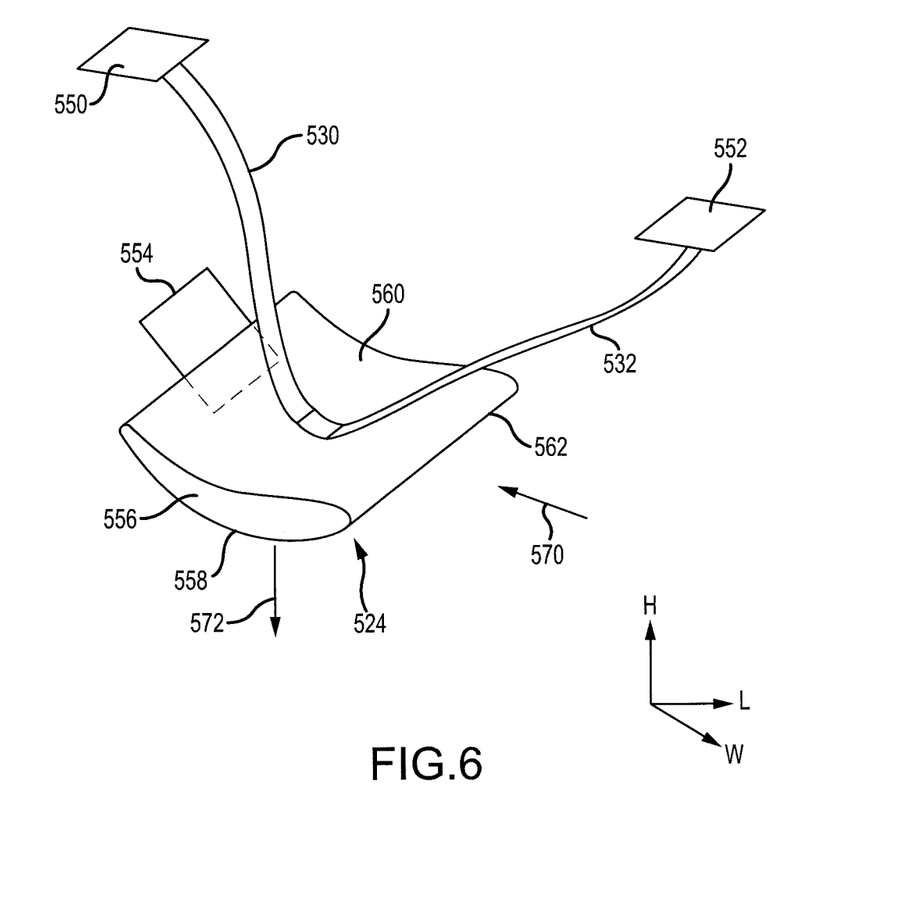
FIG. 6 is a drawing of the rigid airfoil of FIG. 5, in accordance with various embodiments.

Referring now to FIGS. 5 and 6, the inflatable slide 500 further includes an airfoil 524. The airfoil 524 may have different features than the airfoil 324 of FIG. 3. The airfoil 524 may be coupled directly to the main body 501 via a first leader 530 and a second leader 532. In various embodiments, slip rings and/or lanyards may or may not be included. As shown in FIG. 5, the leaders 530, 532 may be directly coupled to the plurality of inflatable portions 506. In particular, the first leader 530 may include a first patch 550 that is coupled to the first inflatable portion 507 and the second leader 532 may include a second patch 552 that is coupled to the second inflatable portion 509.

The airfoil 524 may further include a vertical stabilizer 554 along with a rigid airfoil body 556. In that regard, the airfoil 524 may be referred to as a rigid airfoil. The vertical stabilizer 554 may extend in a direction along a height of the inflatable slide 500. The vertical stabilizer 554 may receive a wind flow 570 and orient a leading edge 562 of the airfoil 524 towards the wind flow 570.

The rigid airfoil body 556 may have an airfoil bottom surface 558 and an airfoil top surface 560. The airfoil bottom surface 558 may have an outward curve. In that regard, in response to the airfoil 524 receiving the wind flow 570, the vertical stabilizer 554 may cause the leading edge 562 of the rigid airfoil body 556 to be directed towards the wind flow 570. Similarly, due to the curvature of the airfoil bottom surface 558 (and potentially an inward curvature of the airfoil top surface 560), the airfoil bottom surface 558 may experience less pressure than the airfoil top surface 560. The pressure differential experienced between the airfoil top surface 560 and the airfoil bottom surface 558 causes a downward force 572 (i.e., in a direction of gravity or in a direction from the top surface 502 to the bottom surface 504) on the airfoil 524. In that regard, the airfoil 524 may act in a similar manner as the airfoil 324 of FIG. 3.

The airfoil 524 may include any rigid or semi rigid material such as, for example, a plastic, a metal, or the like.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An inflatable slide for use in an emergency evacuation system of an aircraft, comprising:

a main body having a top surface, a bottom surface, a first side, a second side, and a width extending from the first side to the second side, the main body being configured to inflate in response to receiving a flow of fluid;

a first lanyard coupled to the main body;

a second lanyard located nearer the second side than the first lanyard;

a first slip ring slidably coupled to the first lanyard and a second slip ring slidably coupled to the second lanyard; and an airfoil coupled to the first slip ring and the second slip ring to facilitate movement of the airfoil towards at least one of the first side or the second side, the airfoil being configured to exert a force on the main body in a downward direction corresponding to a direction of gravity in response to receiving a wind flow, wherein the first slip ring and the second slip ring facilitate movement of the airfoil towards the first side and the second side of the main body via the first lanyard and the second lanyard.

2. The inflatable slide of claim 1, wherein the first lanyard includes a split yoke.

3. The inflatable slide of claim 1, wherein the airfoil includes a flexible fabric and at least one cord.

4. The inflatable slide of claim 3, wherein the flexible fabric includes a nylon-based fabric and the at least one cord includes a nylon kernmantle rope.

5. The inflatable slide of claim 1, wherein the first lanyard includes at least one leader coupled to the airfoil, and wherein the airfoil includes a rigid airfoil body having an airfoil bottom surface having an outward curvature and an airfoil top surface such that a lower pressure is experienced at the airfoil bottom surface than at the airfoil top surface in response to the airfoil receiving the wind flow.

6. An evacuation system for use with an aircraft, comprising:

an aspirator configured to output a flow of fluid; and an inflatable slide having:

a main body having a top surface, a bottom surface, a first side, a second side, and a width extending from the first side to the second side, the main body being configured to inflate in response to receiving the flow of fluid from the aspirator, a first lanyard coupled to the main body, a second lanyard located nearer the second side than the first lanyard, a first slip ring slidably coupled to the first lanyard and a second slip ring slidably coupled to the second lanyard, and an airfoil coupled to the first slip ring and the second slip ring to facilitate movement of the airfoil towards at least one of the first side or the second side, the airfoil being configured to exert a force on the main body in a downward direction corresponding to a direction of gravity in response to receiving a wind flow, wherein the first slip ring and the second slip ring facilitate movement of the airfoil towards the first side and the second side of the main body via the first lanyard and the second lanyard.

7. The evacuation system of claim 6, wherein the first lanyard includes a split yoke.

8. The evacuation system of claim 6, wherein the airfoil includes a flexible fabric and at least one cord.

9. The evacuation system of claim 8, wherein the flexible fabric includes a nylon-based fabric and the at least one cord includes a nylon kernmantle rope.

10. The evacuation system of claim 6, wherein the first lanyard includes at least one leader coupled to the airfoil, and wherein the airfoil includes a rigid airfoil body having an airfoil bottom surface having an outward curvature and an airfoil top surface such that a lower pressure is experienced at the airfoil bottom surface than at the airfoil top surface in response to the airfoil receiving the wind flow.

11. An aircraft comprising:

a fuselage; and an evacuation system coupled to the fuselage and having:

an aspirator configured to output a flow of fluid, and an inflatable slide having:

a main body having a top surface, a bottom surface, a first side, a second side, and a width extending from the first side to the second side, the main body being configured to inflate in response to receiving the flow of fluid from the aspirator, a first lanyard coupled to the main body, a second lanyard located nearer the second side than the first lanyard, a first slip ring slidably coupled to the first lanyard and a second slip ring slidably coupled to the second lanyard, and an airfoil coupled to the first slip ring and the second slip ring to facilitate movement of the airfoil towards at least one of the first side or the second side, the airfoil being configured to exert a force on the main body in a downward direction corresponding to a direction of gravity in response to receiving a wind flow, wherein the first slip ring and the second slip ring facilitate movement of the airfoil towards the first side and the second side of the main body via the first lanyard and the second lanyard.

12. The aircraft of claim 11, wherein the airfoil includes a flexible fabric and at least one cord.

* * * * *